(12) United States Patent
Seo et al.

(10) Patent No.: US 7,742,076 B2
(45) Date of Patent: Jun. 22, 2010

(54) IMAGE-CAPTURING APPARATUS AND CAMERA-SHAKE COMPENSATION MECHANISM

(75) Inventors: Shuzo Seo, Saitama (JP); Takuji Hamasaki, Saitama (JP); Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 1427 days.

(21) Appl. No.: 11/135,303

(22) Filed: May 24, 2005

(65) Prior Publication Data

US 2005/0264656 A1 Dec. 1, 2005

(30) Foreign Application Priority Data

May 25, 2004 (JP) .......................... P2004-154119
May 25, 2004 (JP) .......................... P2004-154156

(51) Int. Cl.
*H04N 5/228* (2006.01)
*H04N 5/225* (2006.01)
(52) U.S. Cl. ................................ 348/208.99; 348/373
(58) Field of Classification Search ............ 348/208.99, 348/373
See application file for complete search history.

(56) References Cited

U.S. PATENT DOCUMENTS

| | | | |
|---|---|---|---|
| 4,780,739 A * | 10/1988 | Kawakami et al. ............ 396/54 |
| 5,214,513 A * | 5/1993 | Lee ........................ 348/207.99 |
| 6,456,790 B2 | 9/2002 | Sasaki et al. | |
| 6,587,148 B1 * | 7/2003 | Takeda et al. ................ 348/342 |
| 6,603,927 B2 | 8/2003 | Enomoto et al. | |
| 6,670,986 B1 * | 12/2003 | Ben Shoshan et al. ... 348/219.1 |
| 7,477,291 B2 * | 1/2009 | Seo ......................... 348/208.7 |
| 2003/0067544 A1 * | 4/2003 | Wada ....................... 348/208.7 |
| 2007/0171295 A1 * | 7/2007 | Kawai ........................ 348/340 |

* cited by examiner

*Primary Examiner*—Sinh Tran
*Assistant Examiner*—Hung H Lam
(74) *Attorney, Agent, or Firm*—Greenblum & Bernstein, P.L.C.

(57) ABSTRACT

An image-capturing apparatus is provided that comprises an imaging device, a support member, a drive mechanism, and a fixed member. The support member supports the imaging device. The drive mechanism moves the support member in a plane parallel to an imaging surface of the imaging device and in an independent first and second directions. The fixed member is placed within a support-member movable-range, in which the support member is moved by the drive mechanism. The drive mechanism induces impact on the support member by engaging the support member with the fixed member.

19 Claims, 16 Drawing Sheets

IMAGE-CAPTURING APPARATUS AND CAMERA-SHAKE COMPENSATION MECHANISM

BACKGROUND OF THE INVENTION

1. Field of the Invention

The present invention relates to an image-capturing apparatus that compensates for a camera-shake by motion of an imaging device, in particular, a digital camera having an interchangeable lens that is provided with a camera-shake compensation mechanism or an anti-shake mechanism.

2. Description of the Related Art

Various types of camera-shake compensation devices are proposed that compensate for a blur of a captured image induced by a shake of a camera body. Conventionally, a camera-shake compensation device, which counterbalances a camera-shake with movement of an imaging device, is known. However, when using a camera with a camera-shake compensation device that shakes the imaging device, it is difficult to hermetically insulate the imaging device from the open air. Therefore, alien substances including dust may stick on the surface of the imaging device, so that such a camera can have problems in which the alien substances deteriorate the image quality when the alien substances come out in the captured image. Particularly, for digital camera with an interchangeable lens, the dust easily enters the camera so that image deterioration due to alien substances is a substantial problem.

To solve the above problem, an image-capturing apparatus is proposed in U.S. 2003/0067544A1 that hermetically encloses an imaging device inside optical filters, such as an optical low-pass filter, an infrared cut-off filter, and so on, to prevent the surface of the imaging device from being exposed to the alien substances. Even for the above image-capturing apparatus, the alien substances stick on the outer surface of the optical filters. However, the image deterioration can be suppressed by blurring the images of the alien substances by having a sufficient distance between the surface of the imaging device (or the imaging surface) and the outer surface of the optical filters.

SUMMARY OF THE INVENTION

However, when using the apparatus disclosed in U.S. 2003/0067544A1, the distance between the optical filters and the surface of the imaging device is required to be large enough to blur the images of the alien substances and this raises a design limitation, and is adverse in reducing the size (or thinning). Further, this apparatus is not effective at maintaining the quality of images when there are large-size alien substances or when the alien substances are accumulated.

An object of the present invention is to provide an image-capturing apparatus and a camera-shake compensation mechanism that have alien-substance removing functionality that is used to remove an alien substance, such as dust, from an imaging device or its cover, by simple construction and at low cost.

According to the present invention, an image-capturing apparatus is provided that comprises an imaging device, a support member, a drive mechanism, and a fixed member.

The support member supports the imaging device. The drive mechanism moves the support member in a plane parallel to an imaging surface of the imaging device and in independent first and second directions. The fixed member is placed within a support-member movable-range, in which the support member is moved by the drive mechanism. The drive mechanism induces impact on the support member by engaging the support member to the fixed member.

Further, according to the present invention, a camera-shake compensation mechanism used in a digital camera is provided that comprises an imaging device and a support member that supports the imaging device. The camera-shake compensation mechanism is a type which moves the support member in a plane that is parallel to an imaging surface of the imaging device and in independent first and second directions in order to compensate for a camera-shake. The mechanism further comprises a fixed member and an alien-substance removing mechanism.

The fixed member is placed at a position outside a camera-shake compensation range in which the support member is moved, for the camera-shake compensation. The alien-substance removing mechanism moves the support member beyond the camera-shake compensation range in order to engage the support member with the fixed member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
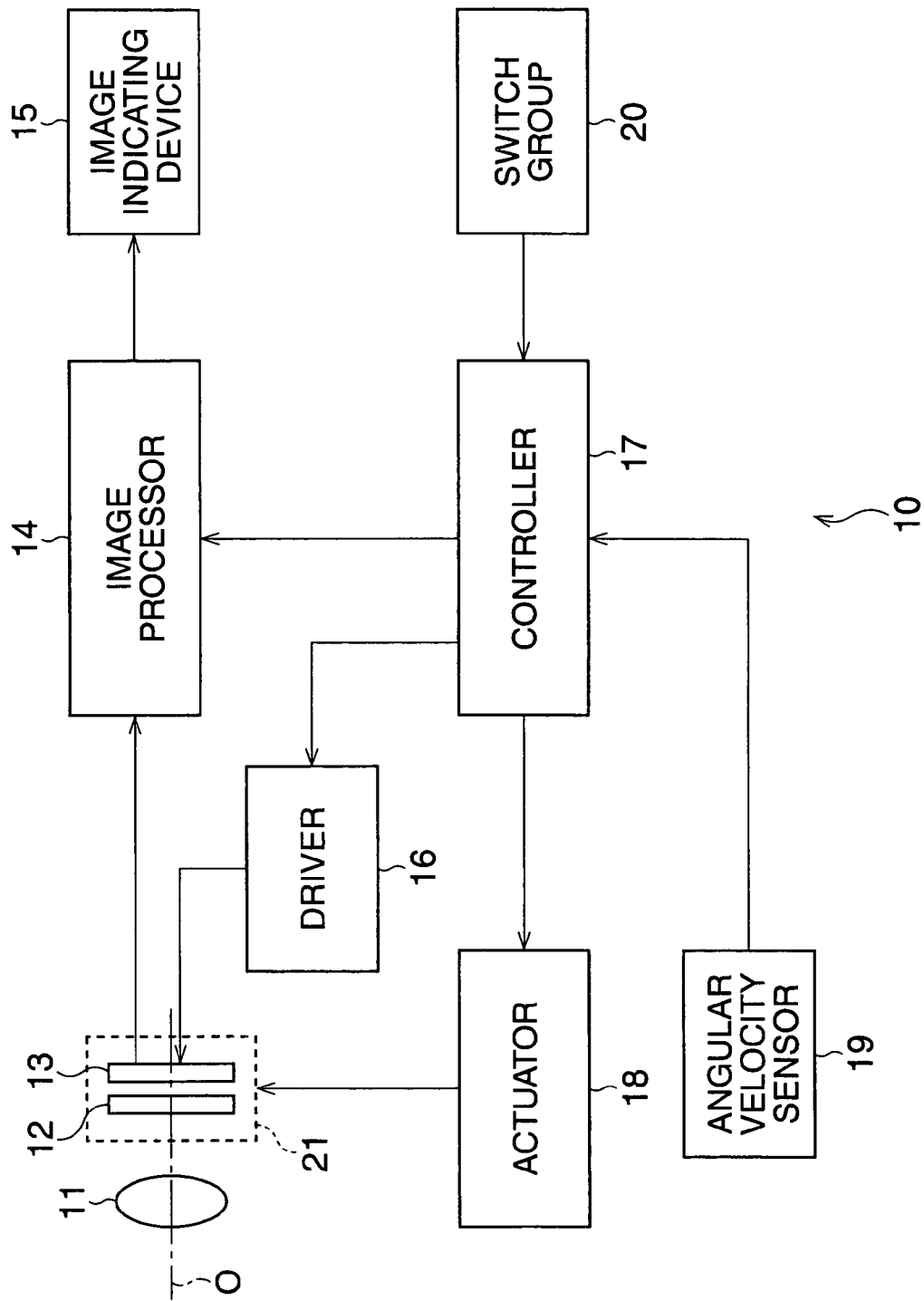
FIG. 1 is a block diagram showing an electric construction of a digital camera provided with a camera-shake compensation device.

The present invention is described below with reference to the embodiments shown in the drawings.

Figure 2:
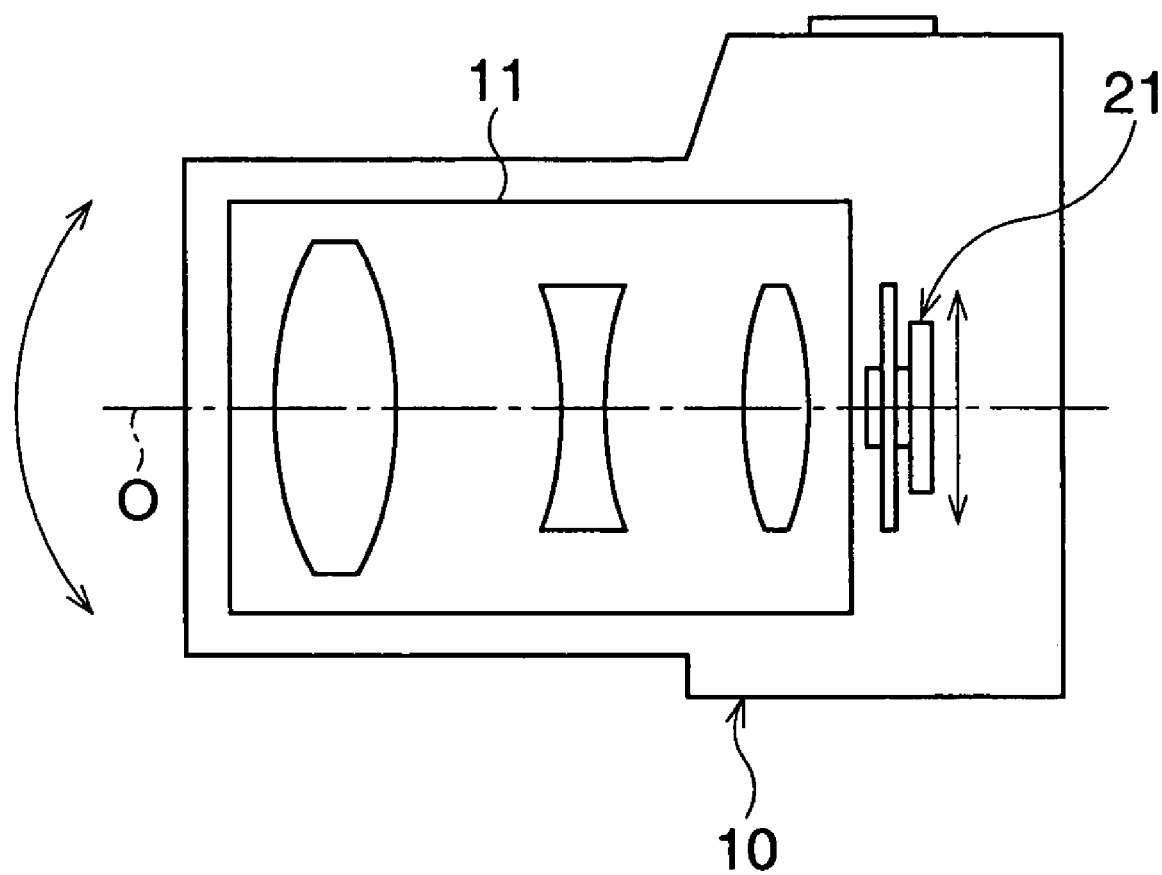
FIG. 2 schematically illustrates the structure of the digital camera.

FIG. 1 is a block diagram showing an electric construction of a digital camera 10 provided with a camera-shake compensation device, to which a first embodiment of the present invention is applied. Further, FIG. 2 schematically illustrates the structure of the digital camera 10.

For example, the digital camera 10 is a camera where the lenses are interchangeable. An image of an object is formed on an imaging surface of the imaging device 13 through a photographing lens system (lenses) 11 mounted on the camera body and through a transparent cover member 12. An image captured by the imaging device 13 is fed to an image processor 14 as image signals, so that a white-balance process, an enhancement process, a gamma correction process, and so on, are carried out. The image signals are then fed to an image-indicating device 15, such as an LCD, and displayed on its screen. Further, a CCD may be employed as the imaging device 13 and is controlled by drive signals from a driver 16.

On the other hand, operations of the image processor 14 and the driver 16 are controlled by a controller 17. Further, an actuator 18, an angular velocity sensor (e.g. gyroscope) 19, and a switch group 20 are also connected to the controller 17.

The angular velocity sensor 19 is a sensor for detecting a shake or a tremble. The controller 17 calculates the displacement of the camera-shake by monitoring variation of the angular velocity. Thereby, the imaging device 13 is shaken in a plane parallel to the imaging surface of the imaging device 13 (or in a plane perpendicular to the optical axis O), in accordance with the displacement calculated by the controller 17, by operating the actuator 18. Namely, the blur is prevented by moving the imaging device 13 in a direction that counterbalances the displacement due to the camera-shake. Note that, in the present embodiment, as discussed later, the transparent cover member 12 is integrally provided on the imaging device 13 to form the imaging portion 21. Namely, in the present embodiment, the actuator 18 shakes the whole of the imaging portion 21, in the plane parallel to the imaging surface.

Figure 3:
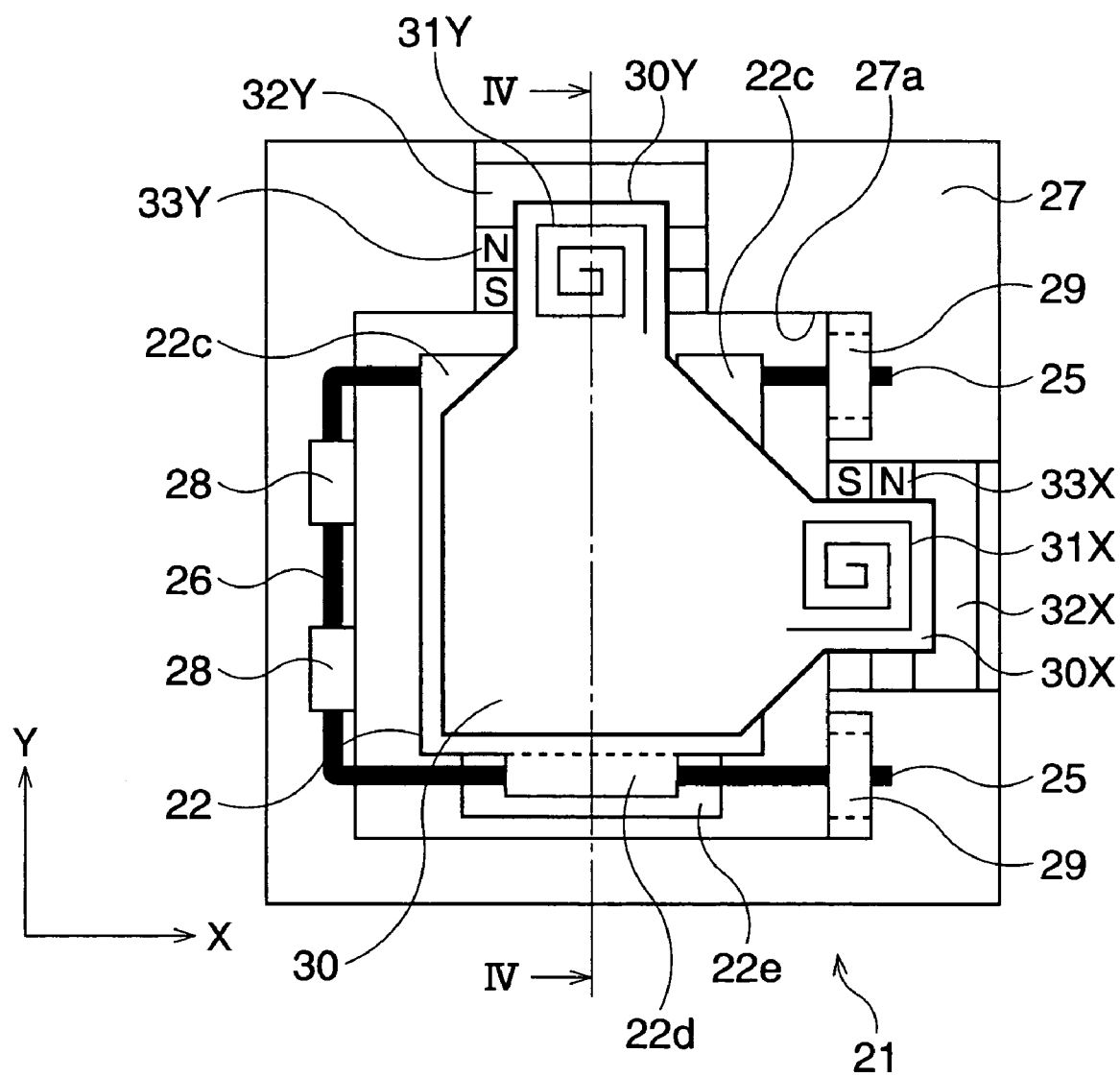
FIG. 3 is a plan view of the imaging portion of the first embodiment viewed from the side opposite to the imaging surface of the imaging device.
Figure 4:
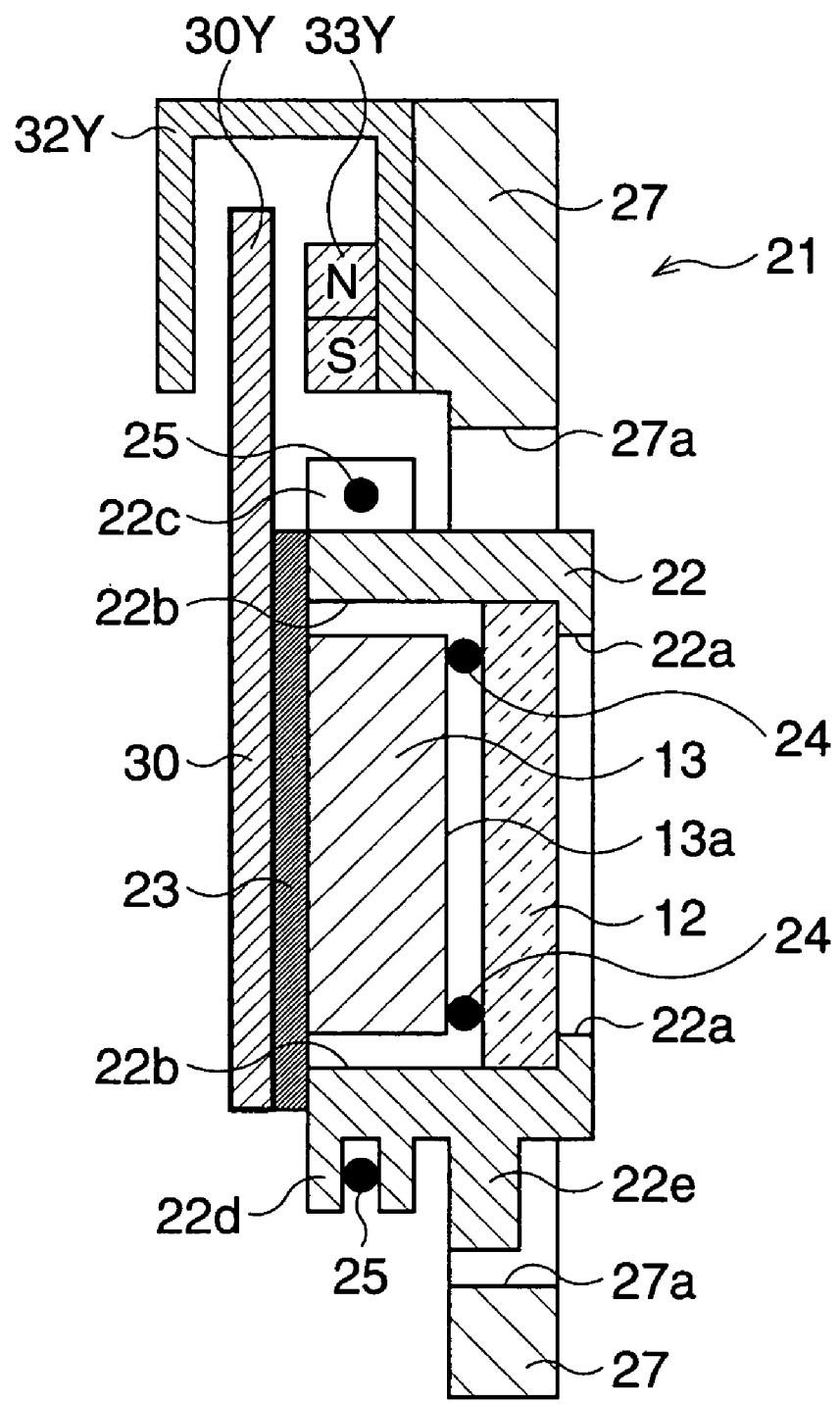
FIG. 4 is a cross-sectional view of the imaging portion along line IV-IV of FIG. 3.

FIG. 3 is a plan view of the imaging portion 21 viewed from the side opposite to the imaging surface of the imaging device 13. FIG. 4 is a cross-sectional view of the imaging portion 21 along line IV-IV of FIG. 3.

The imaging portion 21, for example, has a substantially rectangular shaped casing (support member) 22, which houses the cover member 12 and the imaging device 13. At the bottom of the casing 22, an opening 22a is formed. The opening 22a is hermetically covered with a transparent cover member 12 that is comprised of an optical low-pass filter, an infrared filter, and the like. Further, the other side of the opening 22a of the casing 22 is formed as an opening 22b, so that the imaging device 13 attached on a circuit board 23 is mounted inside the casing 22 through the opening 22b. The peripheral portion of the circuit board 23 is hermetically attached on the edge of the casing 22 that has the opening 22b. Thereby, the imaging device 13 is hermetically housed inside the casing 22 by the casing 22, the transparent cover member 12, and the circuit board 23. Further, urging members 24 are interposed between the imaging device 13 and the transparent cover member 12 in order to fix the relative position between the imaging device 13 and the transparent cover member 12. The light that was made incident into the photographing lens system 11 passes through the transparent cover member 12 of the opening 22a and then forms an image on the imaging surface 13a of the imaging device 13.

The casing 22 is positioned inside a fixed frame 27 where a rectangular opening 27a is formed at the center. The size of the rectangular opening 27a is larger than the outer dimension of the casing 22 and determines a movable range of the casing 22. Namely, the motion or oscillation of the imaging device 13 during the camera-shake compensation operation is achieved by the motion of the casing 22 within the rectangular opening 27a.

In FIG. 3, the lateral direction of a plane parallel to the imaging surface 13a of the imaging device 13 is referred to as the X-axis direction and the longitudinal direction thereof as the Y-axis direction. The X-axis bearings 22c and 22d which receive the respective X-axis guide-rod sections 25 are provided on each of the outer faces of the sidewalls of the casing 22 that face away from each other and that are arranged parallel to the X-axis. Namely, the casing 22 is slidably movable along the X-axis guide-rod sections 25. Further, a knocking section 22e that is used to remove alien substances (detailed later), such as dust, is provided on one side (e.g., lower side in FIG. 3) of the casing 22.

One end of the X-axis guide-rod sections 25 is integrally connected to an end of a Y-axis guide-rod section 26, which is arranged along the Y-axis perpendicular to the X-axis, thereby the X-axis and Y-axis guide-rod sections form a "U" shape guide member. Further, the Y-axis guide-rod section 26 is supported by Y-axis bearings 28 provided on one side of the fixed frame 27 (e.g., on the left side of the fixed frame 27, along the Y-axis, in FIG. 3), so that the Y-axis guide-rod section 26 is slidably movable along the Y-axis.

Further, the other ends of the X-axis guide-rod sections 25 (the ends opposite to the Y-axis guide-rod section 26) are received and supported by guide-member supports 29 which are provided on the right side of the fixed frame along the Y-axis. Each of the guide-member supports 29 has a slot, into which the X-axis guide-rod section 25 is inserted. Each of the slots has a predetermined width along the Y-axis, so that the X-axis guide-rod sections 25 are slidably movable along the Y-axis within the slots. Namely, the U-formed guide member can be integrally moved in the Y-axis direction, and at the same time, the casing 22 can be moved in the X-axis direction along the X-axis guide-rod sections 25. Therefore, the casing 22 is movable within the rectangular opening 27a, along the X-axis and Y-axis at the same time, with respect to the fixed frame 27.

Further, on the rear side of circuit board 23, the side opposite to the face where the imaging device 13 is mounted, a coil circuit board 30 is attached. The coil circuit board 30 comprises an X-axis drive section 30X and a Y-axis drive section 30Y. The X-axis drive section 30X extends out in a direction along the X-axis (the right direction in FIG. 3) from the body (the area that is attached to the circuit board 23) of the coil circuit board 30. Namely, the X-axis drive section 30X extends out to the position where the X-axis drive section 30X overlaps with the fixed frame 27 (the right side frame section), beyond the rectangular opening 27a, and is provided with a coil 31X. On the other hand, the Y-axis drive section 30Y extends out in a direction along the Y-axis (upper direction in FIG. 3) from the body of the coil circuit board 30, to the position where the Y-axis drive section 30Y overlaps with the fixed frame 27 (the upper side frame section), beyond the rectangular opening 27a, and is provided with a coil 31Y, similar to the X-axis drive section 30X.

The X-axis drive section 30X and the Y-axis drive section 30Y are arranged at a predetermined distance apart from the fixed frame 27. On the fixed frame 27, at the positions which overlap with the coil 31X and 31Y, "U" shaped yokes 32X and 32Y are provided that surround the respective X-axis drive section 30X and the Y-axis drive section 30Y. Further, a magnet 33X, which is fixed to the yoke 32X, is provided between the yoke 32X and the X-axis drive section 30X, and a magnet 33Y, which is fixed to the yoke 32Y, is provided between the yoke 32Y and the Y-axis drive section 30Y. Namely, the coil circuit board 30 is movable in the X and Y directions by controlling the electric supply to the coils 32X and 32Y. Therefore, by cooperating the X and Y direction motion control, the imaging device 13 can be moved in any directions on the X-Y plane. Note that, a part of the yokes 32X and 32Y, which surround the X-axis drive section 30X and the Y-axis drive section 30Y, is cut out form the FIG. 3, in order to indicate the X-axis drive section 30X and the Y-axis drive section 30Y.

Figure 5:
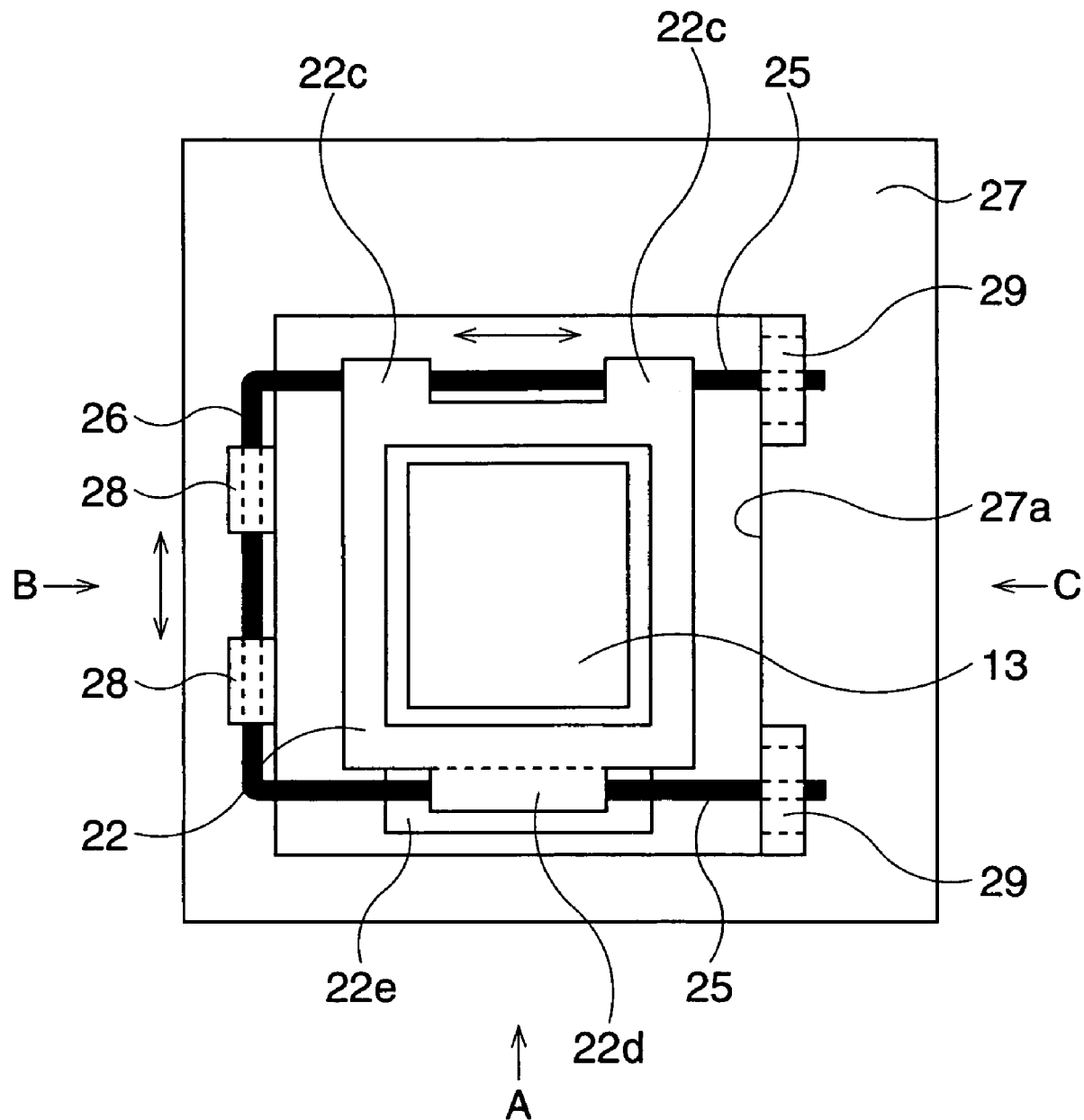
FIG. 5 shows the state when the coil circuit board, the circuit board, the yokes, and the magnets are removed from FIG. 3.
Figure 6:
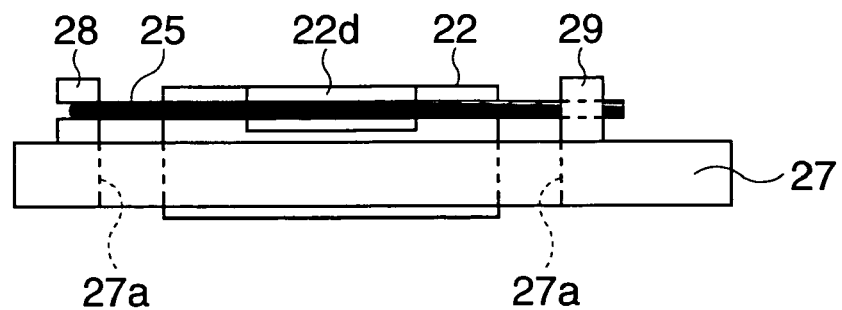
FIG. 6 is a side elevational view from the direction defined by the arrow "A" in FIG. 5.
Figure 7:
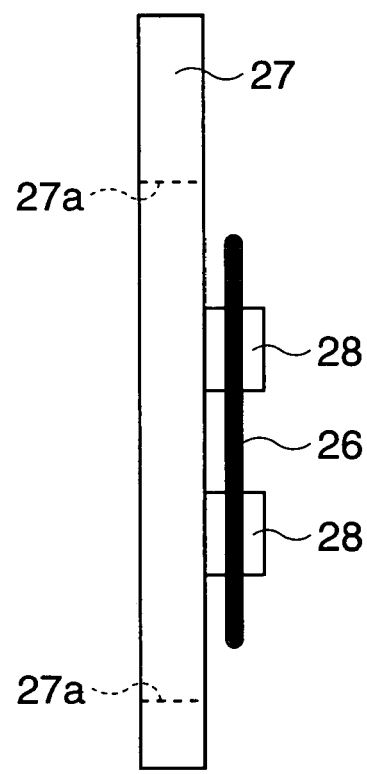
FIG. 7 is a side elevational view from the direction defined by the arrows "B" in FIG. 5.
Figure 8:
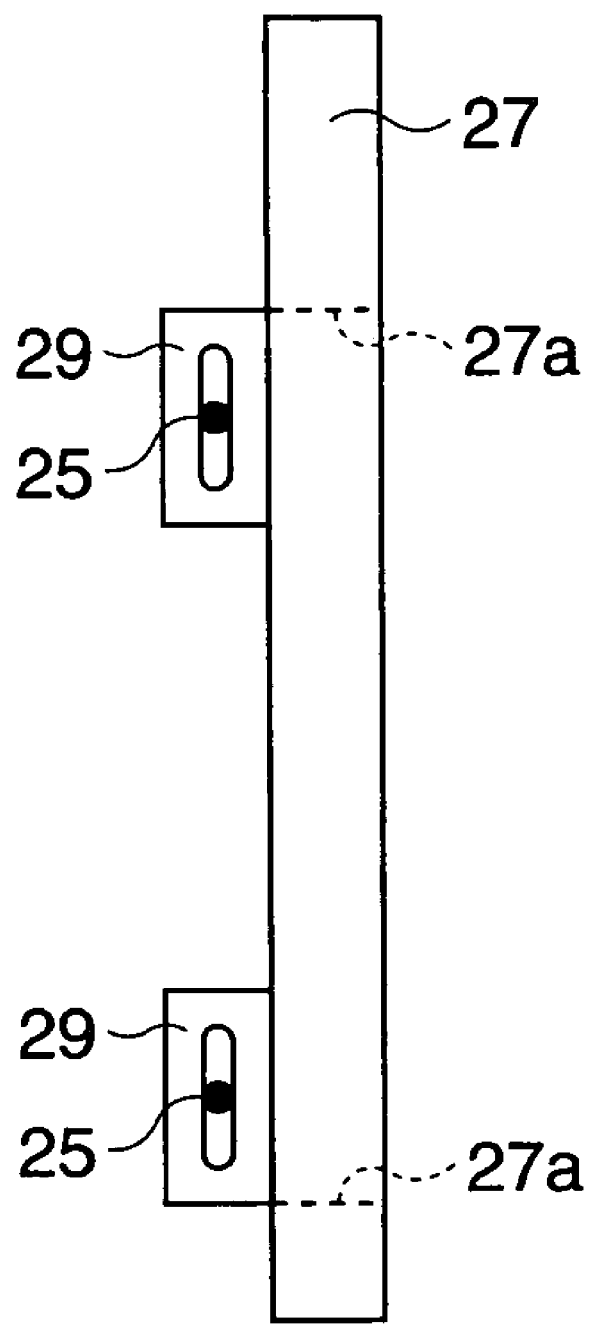
FIG. 8 is a side elevational view from the direction defined by the arrows "C" in FIG. 5.

FIG. 5 shows the state when the coil circuit board 30, the circuit board 23, the yoke 31X and 31Y, and the magnet 32X and 32Y are removed from FIG. 3. FIG. 6 illustrates the side elevational view from the direction defined by the arrow "A" in FIG. 5. Further, FIGS. 7 and 8 are the side elevational views from the respective directions defined by the arrows "B" and "C" in FIG. 5. In FIG. 7, the structures relating to the casing 22 and the guide-member supports 29 are omitted. In FIG. 8, the structures relating to the casing 22 and the Y-axis bearings 28 are omitted.

Next, with reference to FIGS. 1, 3, 4, and 9, the alien substance removing functionality of the first embodiment is explained. The digital camera 10, for example, has a camera-shake compensation mode that uses camera-shake compensation functionality. When the camera-shake compensation mode is set, the casing 22 (or imaging device 13) is moved to cancel the induced camera-shake by driving the actuator 18, which comprises the X-axis drive section 30X and Y-axis drive section 30Y, in accordance with signals from the angular velocity sensor 19. Note that, this motion is carried out within the rectangular opening 27a and in the range where the casing 22 does not contact the fixed frame 27 (a camera-shake compensation range).

Further, the digital camera 10 has an alien-substance removing mode. For example, when the alien-substance removing mode is selected by an operation of the switch group 20, the controller 17 actuates the actuator 18 in order to shake off the alien substances, such as dust, from the cover member 12. In the first embodiment, only the Y-axis drive section 30Y is actuated, so that the knocking section 22e of the casing 22 repeatedly strikes or collides with one side of the fixed frame 27 (in the present embodiment, the lower edge of the fixed frame 27). At this time, the actuator 18 (the Y-axis drive section 30Y) is driven by high frequency pulse signals so that the knocking section 22e strikes the frame at high frequency. Note that, the alien-substance removing mode can also be automatically actuated for a predetermined period at a predetermined time, such as when the camera is turned on and the like.

Figure 9:
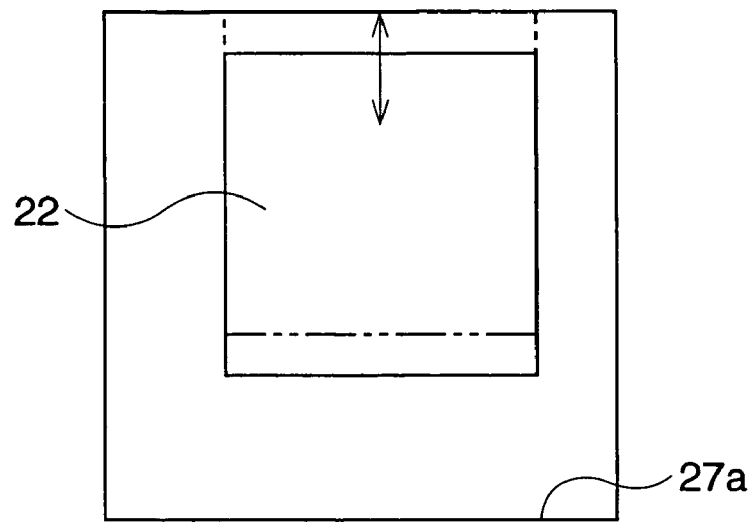
FIG. 9 shows a first embodiment of an alien-substance removing operation.

In the embodiment shown in FIGS. 3 and 4, the casing 22 strikes only the lower edge of the fixed frame 27, the casing 22 can also be continuously knocked against the upper edge of the fixed frame 27 or either of the right or left edge at high frequency oscillation, as shown in FIG. 9.

As described above, according to the first embodiment, impulses can be continuously given to the casing by knocking the casing against one of the edge of the fixed frame, so that the dust or the alien substances can be shaken off from the cover member provided on the casing by the impact induced by the above impulses.

Figure 10:
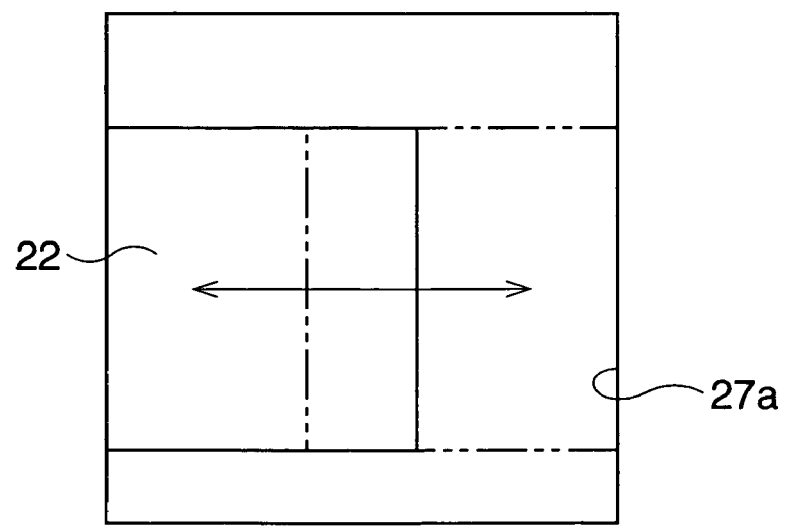
FIG. 10 shows an alternate embodiment of the alien-substance removing operation.
Figure 11:
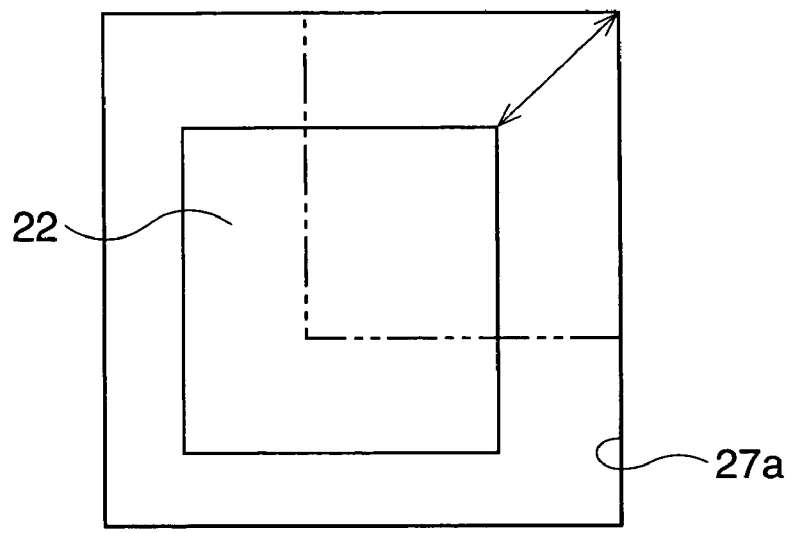
FIG. 11 shows another alternate embodiment of the alien-substance removing operation.
Figure 12:
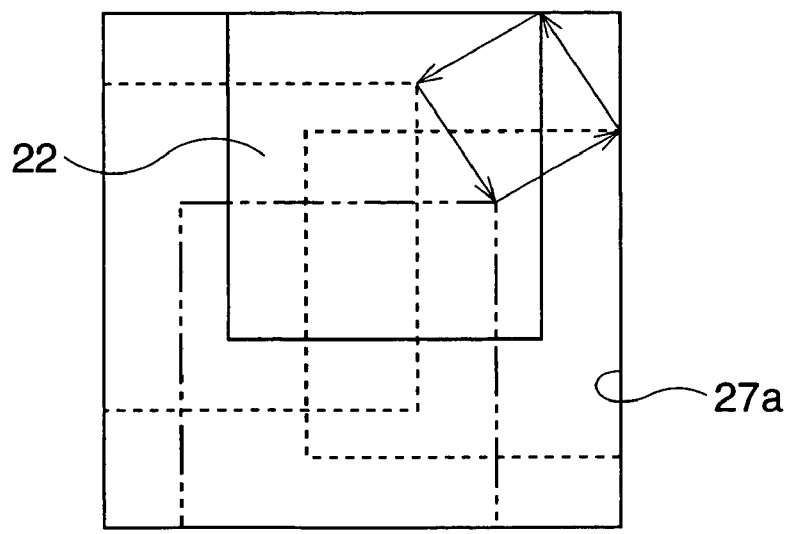
FIG. 12 shows another alternate embodiment of the alien-substance removing operation.

With reference to FIGS. 10-12, alternate embodiments of the alien-substance removing operation of the alien-substance removing mode are explained.

In the above embodiment, the casing 22 is merely knocked against one edge of the fixed frame 27. However, in the alternate embodiment of FIG. 10, the casing 22 is repeatedly and alternately knocked against both the right and left sides or both the upper and lower sides of the fixed frame 27. Thereby, two opposite direction impacts can act on the alien substances and the alien substances can be shaken off more efficiently. Note that, in this alternate embodiment, the alien-substance removing operation is carried out by actuating only one of the X-axis drive section 30X or the Y-axis drive section 30Y.

In another alternate embodiment shown in FIG. 11, both the X-axis drive section 30X and the Y-axis drive section 30Y are actuated, so that a corner of the casing 22 is repeatedly knocked against a corresponding corner of the rectangular opening 27a. Further, in another alternate embodiment shown in FIG. 12, the casing 22 is moved in an oblique direction (e.g., along a line slanted at 45 degrees against the X-axis or the Y-axis), so that the casing 22 is knocked against one of the edges of the rectangular opening 27a from the oblique direction. The motion of the casing 22 is then altered in a direction vertical to the former direction so that the casing 22 is knocked against a neighboring edge of the fixed frame 27. The same motion is repeated in turn so that the casing 22 is successively knocked against the four edges of the rectangular opening 27a. According to the alternate embodiments of FIGS. 11 and 12, the alien substances that can easily be shaken off in oblique directions can be effectively shaken off since obliquely directed impacts can be effectively induced on the alien substances.

Note that, the alien-substance removing operation of the first embodiment and its alternate embodiments can be carried out in combination. Further, the direction of the motion of the casing can be set at any angle. In the alternate embodiments, the description relating to knocking section is omitted, however, the knocking sections can also be provided for each side of the casing, which will be knocked against the fixed frame, as required.

Further, although in the above-described embodiments, the casing is knocked against the fixed frame, a target to be knocked by the casing is not limited to the fixed frame. An exclusive knocking member, which is fixed to the camera body, can also be made available if it can induce the impulse against the cover member or the imaging device.

Next a second embodiment of the present invention will be explained. The second embodiment has a similar construction as that of the first embodiment and its alternatives. Therefore, the structures dissimilar to those of the first embodiment are only described in the following descriptions and the structures which are the same as those in the first embodiment will be referred to using the same numerals.

Figure 13:
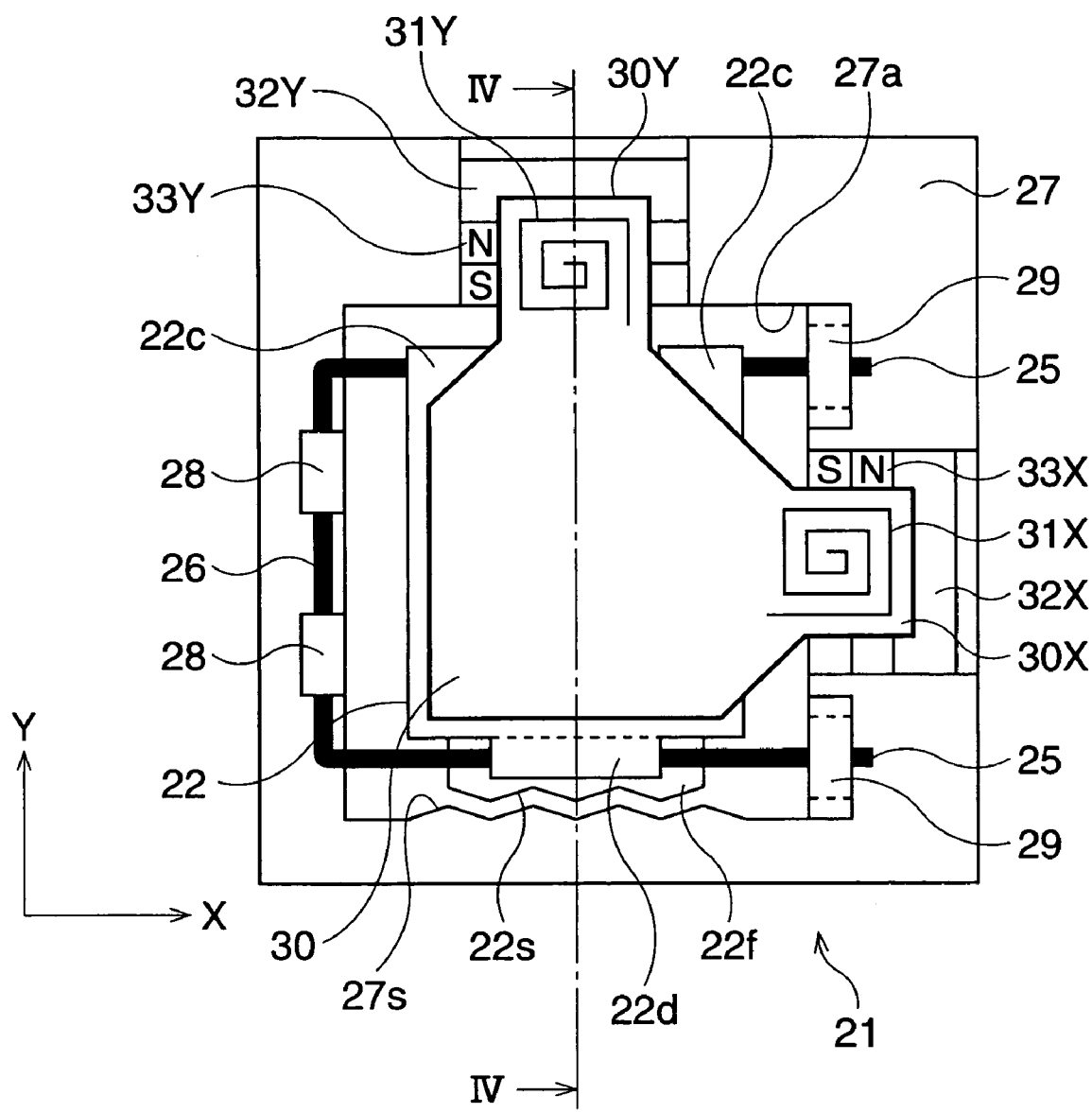
FIG. 13 is a plan view of the imaging portion of the second embodiment viewed from the side opposite to the imaging surface of the imaging device.
Figure 14:
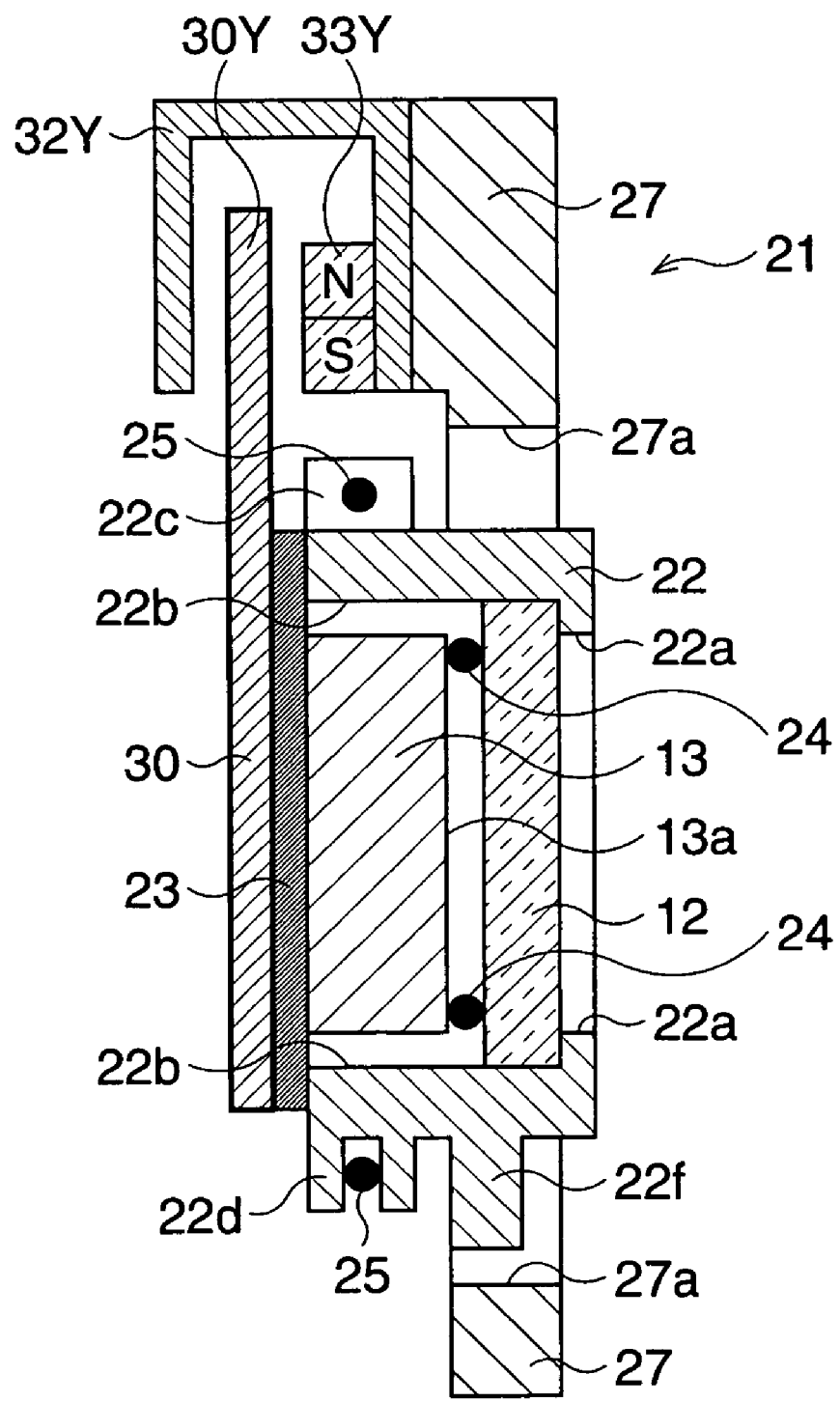
FIG. 14 is a cross-sectional view of the imaging portion along line IV-IV of FIG. 13.
Figure 15:
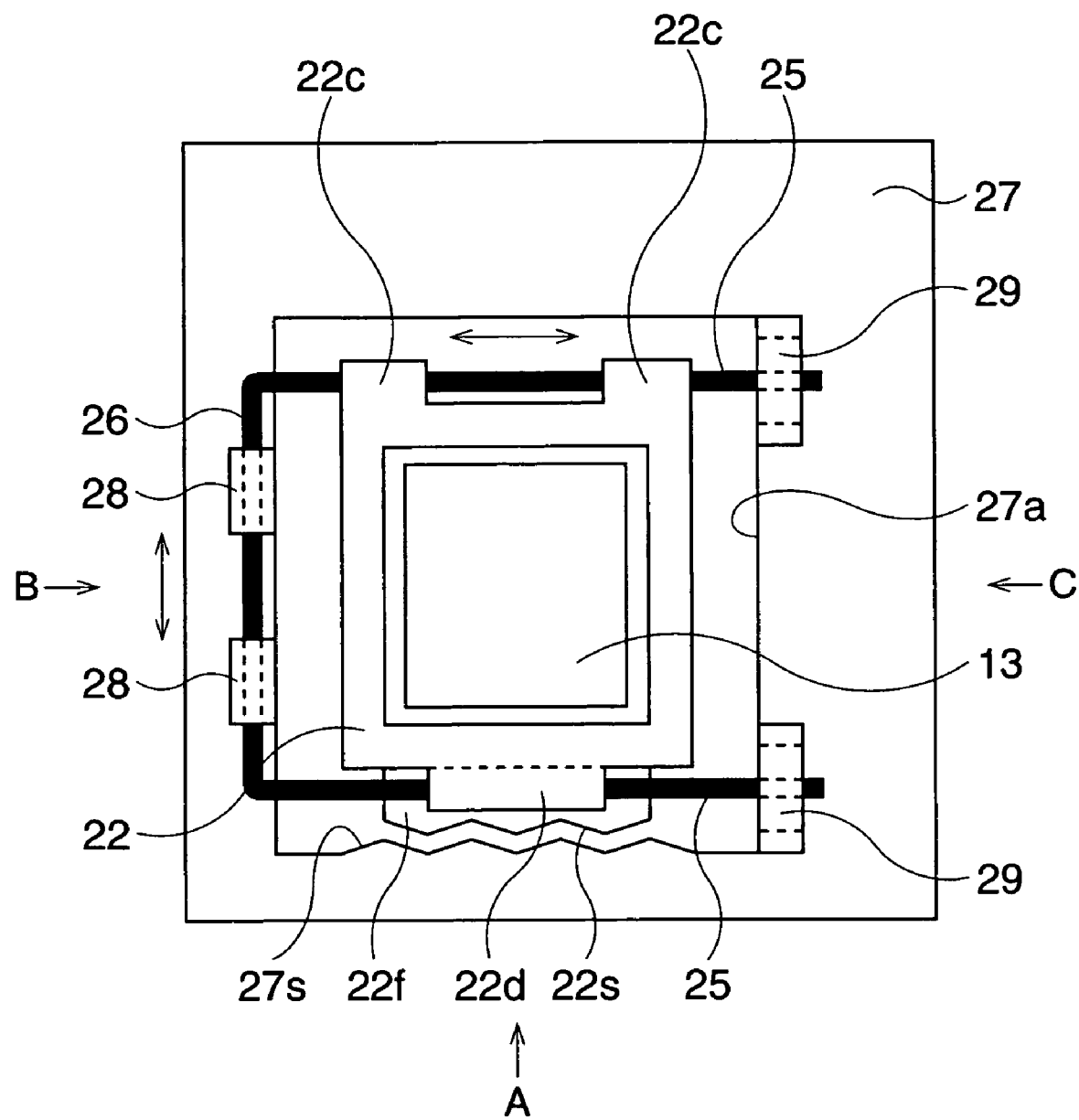
FIG. 15 shows the state when the coil circuit board, the circuit board, the yokes, and the magnets are removed from FIG. 13.
Figure 16:
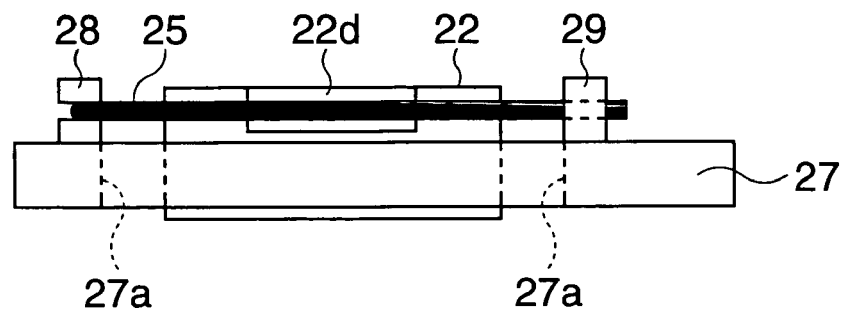
FIG. 16 illustrates a side elevational view from the direction defined by the arrow "A" in FIG. 15.
Figure 17:
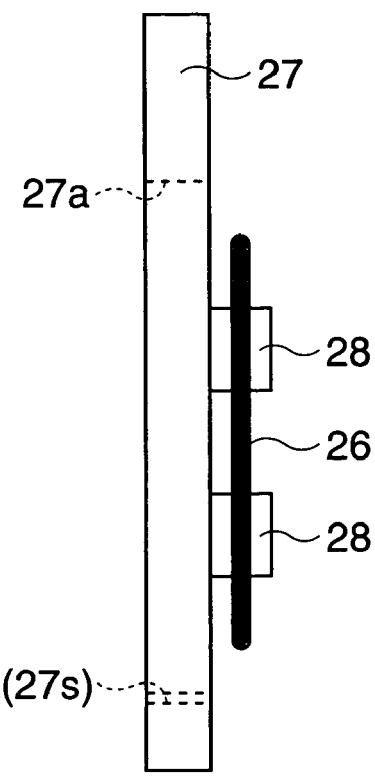
FIG. 17 is a side elevational view from the direction defined by the arrows "B" in FIG. 15.
Figure 18:
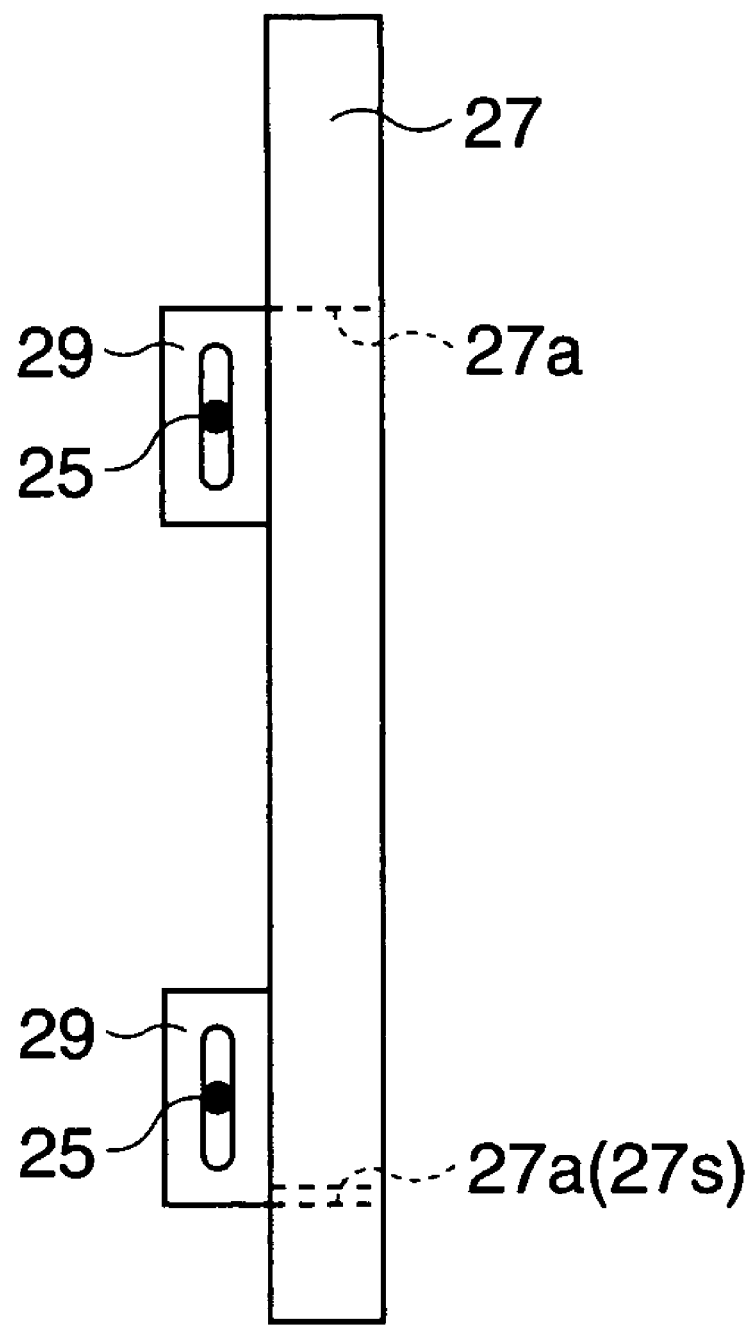
FIG. 18 is a side elevational view from the direction defined by the arrow "C" in FIG. 15.

Dissimilar to the first embodiment, the casing 22 has an abutting section 22f in place of the knocking section 22e of the first embodiment, as shown in FIG. 13. Note that, FIGS. 13-18 of the second embodiment correspond to FIGS. 3-8 of the first embodiment.

In the second embodiment, an end face 22S of the abutting section 22f, which will be engaged with the fixed frame 27, has a bumpy or uneven configuration, for example, a jagged profile which may be comprised of a plurality of continuous chevron shapes. Further, as in FIGS. 13 and 15, an inner surface (an abutting face) 27S of the lower frame section of the fixed frame 27, which faces the end face 22S, also has a bumpy configuration. In this embodiment, the abutting face 27S of the lower frame section is also formed as the jagged profile that can be complementary engaged with the above-shaped end face 22S. Note that, the alien-substance removing mode of this embodiment may also be automatically carried out at a predetermined time, such as when the camera is powered on.

In the alien-substance removing mode, the Y-axis drive section 30Y is actuated so that the end face 22S of the abutting section 22f is born upon the abutting face 27S of the fixed frame 27 at a predetermined abutting or bearing force. While maintaining the bearing force in the Y-axis direction, the X-axis drive section 30X is then actuated, thereby the abutting section 22f of the casing 22 is moved back and forth (right and left) in the X-axis direction. In this operation, since both the end face 22S and the abutting face 27S have a bumpy configuration, the casing 22 is subjected to an impact in the directions of the X and Y axes.

As described above, according to the second embodiment, impact which is carried out through the engagement between the bumpy surfaces can be repeatedly given to the casing by the sliding motion between the casing and the fixed member (fixed frame). Thereby, the alien substances, such as dust, can be shaken off from the cover member provided on the casing or the imaging device by the above impact.

Figure 19:
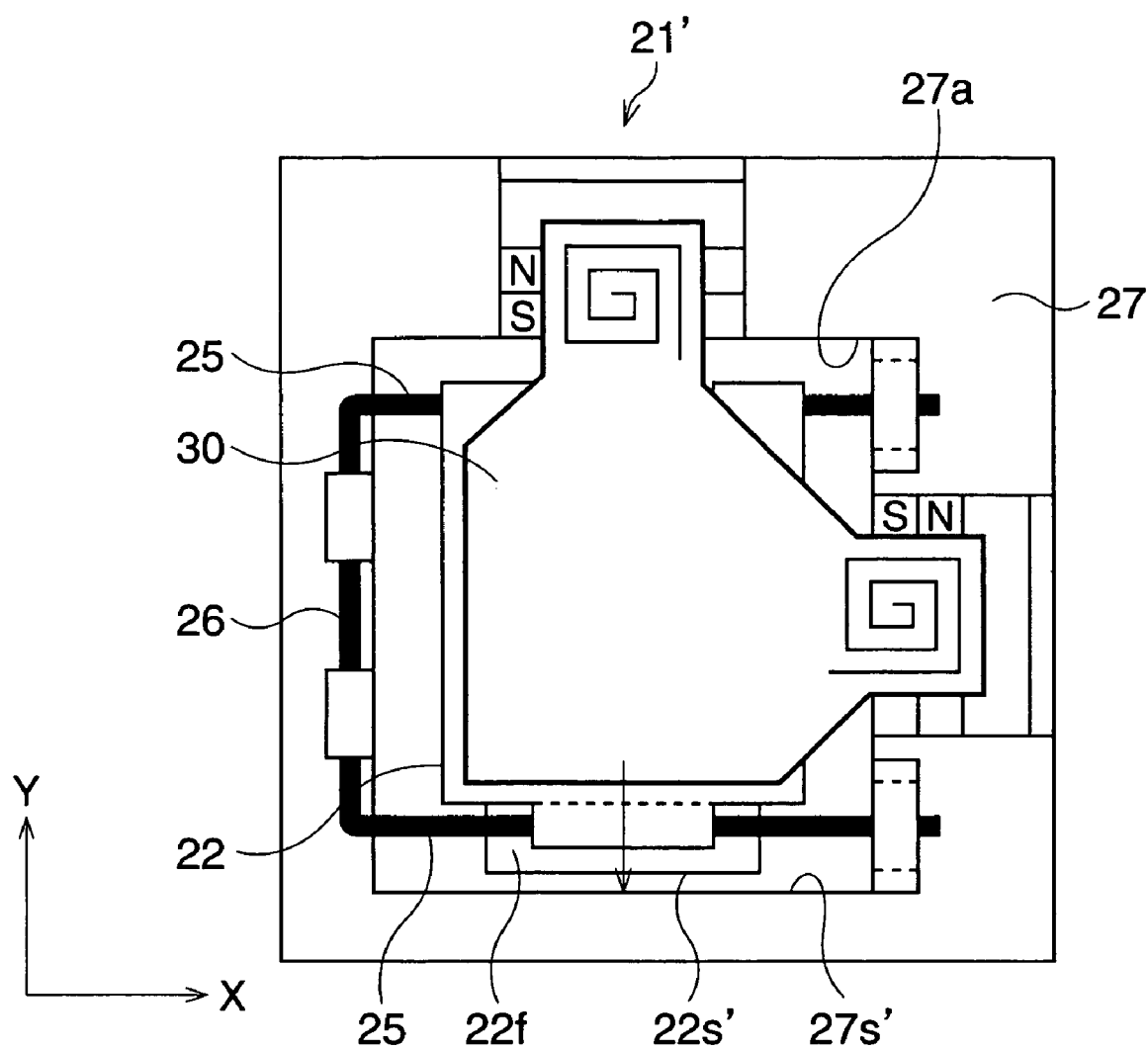
FIG. 19 is a plan view of the imaging portion of the third embodiment viewed from the side opposite to the imaging surface of the imaging device.
Figure 20:
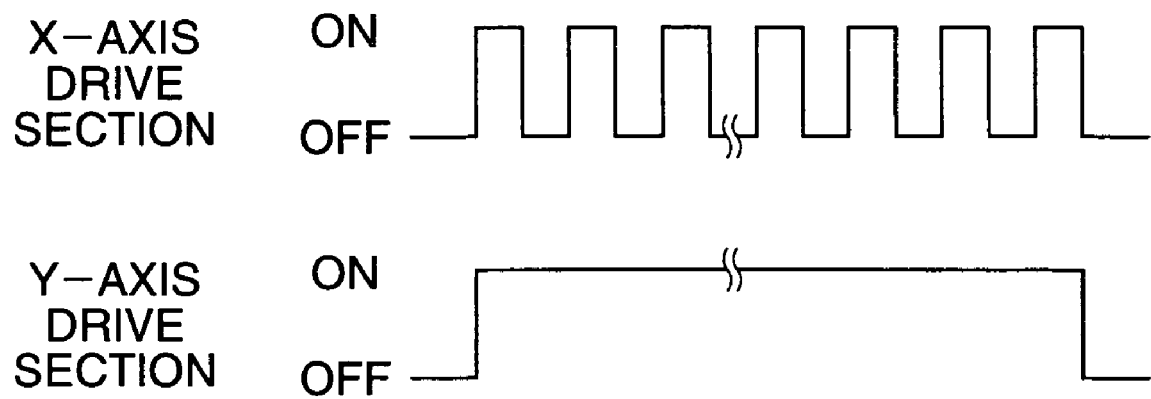
FIG. 20 is an example of a timing chart for the drive pulse signals supplied to the X-axis drive section and the Y-axis drive section.

With reference to FIGS. 19 and 20, an alien-substance removing mechanism of a third embodiment is explained. The construction of the digital camera of the third embodiment is the same as that of the second embodiment, except for a part of the imaging portion 21. Therefore, the structures that are the same as those in the second embodiment are referred to using the same numerals and their descriptions are omitted.

In the second embodiment, the end face 22S of the abutting section 22f and the abutting face 27S of the fixed frame 27 are formed as a bumpy configuration. However, in the third embodiment, the configuration of an end face 22S' of the abutting section 22f and the configuration of an abutting face 27S' of the fixed frame 27 are formed as a substantially flat faces and at least one of the surfaces includes high frictional material, such as rubber and the like, or a high frictional surface that is finished as a uniform rough surface.

As well as the second embodiment, the Y-axis drive section 30Y is first actuated in the alien-substance removing mode, so that the end face 22S' is pressed against the abutting face 27S' at predetermined bearing force, and then the casing 22 is moved back and forth along the X-axis by actuating the X-axis drive section 30X. However, in the third embodiment, cyclical pulse signals, in which ON and OFF states are repeated, are supplied to the X-axis drive section 30X, while a constant voltage is being applied to the Y-axis drive section 30Y, as shown in FIG. 20. Namely, although the bearing force applied from the end face 22S' to the abutting face 27S', which is generated by the Y-axis drive section 30Y, is constant, the sliding force in the lateral directions generated by the X-axis drive section 30X is intermittent (cyclic in the present embodiment).

The end face 22S' and the abutting face 27S' are both flat in the third embodiment. However, since the sliding force is intermittently applied in accordance with the ON and OFF states of the X-axis drive section 30X, the casing 22 is moved in the lateral direction against the friction when the X-axis drive section 30X is in the ON state, and suddenly stops when it changes to the OFF state, such that it induces the so called stick-slip motion. Thereby, a large acceleration is intermittently provided to the casing 22 so that the alien substances are shaken off from the cover member 12.

Note that, in FIG. 20, only the pulse signals for moving the casing in one direction of the X-axis are illustrated, the inversed pulse signals are applied when the casing is moved in the opposite direction. Further, a similar effect can also be obtained by applying the intermittent pulse signals to the Y-axis drive section while applying a predetermined level of voltage to the X-axis drive section. Namely, the intermittent sliding motion between the end face of the abutting section and the abutting face of the fixed frame can be achieved by controlling the intensity of the friction (normal reaction force) while maintaining the sliding force at a constant value.

As described above, according to the third embodiment, the same effect as the second embodiment can be obtained. Note that, in the above-descriptions, only one of the bearing (abutting) force or the sliding force is intermittently given, however, both of the bearing force and the sliding force can also be intermittently or variably given.

Figure 21:
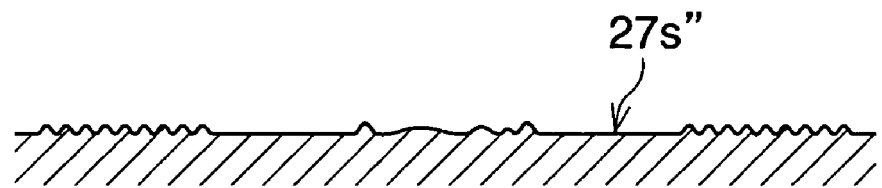
FIG. 21 illustrates an example of the magnified appearance of the abutting face of the forth embodiment, which is configured to be a random frictional surface.

Next, with reference to FIG. 21, a forth embodiment of the present invention will be explained. The construction of the third embodiment is substantially the same as that of the third embodiment, therefore, the structures that are the same as those in the third embodiment are referred to by the same numerals and their descriptions are omitted.

In the third embodiment, the stick-slip motion is achieved by controlling the X-axis drive section 30X and the Y-axis drive section 30Y. However, in the forth embodiment, the stick-slip motion is achieved by controlling the frictional coefficient between the end face 22S of the abutting section 22f and a abutting face 27S" of the fixed frame 27. Namely, the abutting face 27S", for example, is finished as a random frictional surface, as shown in FIG. 21. When applying the lateral sliding force to the casing 22 while pressing the abutting section 22f of the casing 22 onto the fixed frame 27 at a predetermined force intensity, the casing 22 repeats the move and stop motion by the stick-slip phenomena, so that the alien substances are shaken off from the cover member by the induced impact.

As described above, according to the forth embodiment, an effect similar to the third embodiment can be obtained. Note that, the random frictional surface can also be formed on the abutting section 22f of the casing 22.

Further, although in the second to forth embodiments, the casing is moved along a side of the fixed frame while it is born upon the fixed frame, a member on which the casing can be abutted is not limited to the fixed frame. An exclusive sliding member, which is fixed to the camera body, can also be used if it can induce an impulse against the cover member or the imaging device. Further, the second and third embodiments or the third and forth embodiments can also be applied in combination.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2004-154119 and No. 2004-154156 (both filed on May 25, 2004), which are expressly incorporated herein, by references, in their entirety.

The invention claimed is:

1. An image-capturing apparatus, comprising:
   an imaging device;
   a support member that supports said imaging device;
   a drive mechanism that moves said support member in a plane parallel to an imaging surface of said imaging device and in independent first and second directions, said drive mechanism comprising a camera-shake compensation mechanism that compensates for a camera-shake by moving said support member in said first and second directions; and
   a fixed member that is placed at a position outside a camera-shake compensation range in which said support member is moved for the camera-shake compensation and within a support-member movable-range in which said support member is moved by said drive mechanism;
   wherein said drive mechanism induces impact on said support member by moving said support member beyond the camera-shake compensation range and colliding said support member against said fixed member.

2. An image-capturing apparatus according to claim 1, wherein said imaging device is hermetically sealed with a transparent cover member that is arranged on an optical path and an alien substance on an outer surface of said cover member is removed by the impact.

3. An image-capturing apparatus according to claim 1, wherein said first and second directions are orthogonal.

4. An image-capturing apparatus according to claim 3, wherein said support member is moved along said first direction so as to collide against said fixed member in order to generate the impact, in an alien-substance removing mode.

5. An image-capturing apparatus according to claim 4, wherein the impact of said support member against said fixed member is repeatedly performed by a high frequency pulse drive.

6. An image-capturing apparatus according to claim 4, wherein said fixed member comprises two fixed sections, and said support member is alternately collided against said two fixed sections, which are aligned in said first direction with said support member being arranged between each, in said alien-substance removing mode.

7. An image-capturing apparatus according to claim 4, wherein said support member is further moved in said second direction so as to collide against said fixed member, in said alien-substance removing mode.

8. An image-capturing apparatus according to claim 7, wherein said fixed member comprises four fixed sections that surround said support member, and said support member is collided against said four fixed sections.

9. An image-capturing apparatus according to claim 1, wherein said fixed member comprises a frame that surrounds said support member.

10. An image-pickup apparatus according to claim 1, wherein said drive mechanism abuts an end face of said support member onto an abutting face of said fixed member and slides said support member along said abutting face, so that an impact is induced on said support member.

11. An image-pickup apparatus according to claim 10, wherein each of said end face and said abutting face comprises a bumpy configuration.

12. An image-pickup apparatus according to claim 10, wherein one value of a bearing force, to abut said end face against said abutting face, and a sliding force, to slide said support member along said abutting face, is varied in order to generate the impact.

13. An image-pickup apparatus according to claim 12, wherein said end face and said abutting face are configured as a flat surface.

14. An image-pickup apparatus according to claim 10, wherein at least one of said end face and said abutting face is configured as a random frictional surface.

15. An image-pickup apparatus according to claim 1, wherein said image-pickup apparatus is provided in a camera, and said drive mechanism operates in an alien-substance removing mode which is actuated when the camera is turned on.

16. A camera-shake compensation mechanism used in a digital camera that comprises an imaging device and a support member that supports said imaging device, and which moves said support member in a plane parallel to an imaging surface of said imaging device and in independent first and second directions in order to compensate for a camera-shake, said mechanism further comprising:
   a fixed member that is placed at a position outside a camera-shake compensation range in which said support member is moved for the camera-shake compensation; and
   an alien-substance removing mechanism that impacts said support member on said fixed member by moving said support member beyond the camera-shake compensation range in order to collide said support member against said fixed member.

17. A camera-shake compensation mechanism according to claim 16, wherein the impact is induced by abutting an end face of said support member onto an abutting face of said fixed member and sliding said support member along said abutting face.

18. A camera-shake compensation mechanism according to claim 16, wherein said alien-substance removing mechanism is actuated when the digital camera is turned on.

19. A camera-shake compensation mechanism according to claim 16, wherein said support member is moved along said first direction so as to collide against said fixed member in order to generate the impact, in an alien-substance removing mode.

* * * * *